United States Patent
Gupta et al.

[11] Patent Number: 5,483,593
[45] Date of Patent: Jan. 9, 1996

[54] CALL PROGRESS DECODER FOR MULTIPLE CADENCED TONES ON TELEPHONE LINES

[75] Inventors: Sanjay Gupta, Quincy; Timothy Lis, Framingham, both of Mass.

[73] Assignee: Motorola, Inc., Schaumburg, Ill.

[21] Appl. No.: 146,772

[22] Filed: Nov. 1, 1993

Related U.S. Application Data

[63] Continuation of Ser. No. 631,830, Dec. 21, 1990, abandoned.

[51] Int. Cl.⁶ ........................................ H04M 3/00
[52] U.S. Cl. ........................................ 379/386; 379/372
[58] Field of Search .................... 379/372, 377, 379/381, 382, 386

[56] References Cited

U.S. PATENT DOCUMENTS

| | | | |
|---|---|---|---|
| 3,270,144 | 8/1966 | Vogel et al. | 379/386 |
| 4,439,639 | 3/1984 | Munter | 379/386 |
| 4,473,720 | 9/1984 | Hegi | 379/355 |
| 4,528,664 | 7/1985 | Cheng et al. | 379/386 |
| 4,686,699 | 8/1987 | Wilkie. | |
| 4,696,031 | 9/1987 | Freudberg et al. | 379/386 |
| 4,805,212 | 2/1989 | Hase et al. | 379/355 |
| 4,935,958 | 6/1990 | Morganstein et al. | 379/372 |
| 5,007,000 | 4/1991 | Baldi | 379/386 |
| 5,063,593 | 11/1991 | Kwon | 379/386 |

*Primary Examiner*—Jeffery A. Hofsass
*Assistant Examiner*—Scott Wolinsky
*Attorney, Agent, or Firm*—Darleen J. Stockley

[57] ABSTRACT

Apparatus for detecting single and/or multiple cadenced tone progress status of a telephone call in any one of a plurality of telephone networks is disclosed. A set of parameters for each of a multiplicity of predetermined single and/or cadenced tones in which some call progress status having multiple different sets of parameters for the same call progress status are stored in memory. Parameters of the cadence (s) of a valid tone present on the telephone line are measured and compared with the multiplicity of sets of parameters stored in the memory to establish the presence of the call progress status represented by the corresponding cadenced valid tone. For tones having multiple cadences, the measured parameters of each cadence is compared with a corresponding set of cadence parameters of the memory to establish the presence of the call progress status represented by the multiple cadenced tone.

2 Claims, 9 Drawing Sheets

5,483,593

CALL PROGRESS DECODER FOR MULTIPLE CADENCED TONES ON TELEPHONE LINES

This is a continuation of application Ser. No. 07/631,830, filed Dec. 21, 1990, and now abandoned.

BACKGROUND OF THE INVENTION

The present invention is related to auto dial communication equipment in general and more particularly to a call progress status detector thereof for detecting a cadenced tone progress status of a telephone call in any one of a plurality of telephone networks.

When a user places a call in a dial telephone network, he or she first picks up the hand set and listens for a dial tone then dials the number. Thereafter, the user listens for a busy signal or a ring back signal, then either disconnects as a result of the busy signal or after waiting through a number of ring back signals, or the other party answers the call which constitutes a connection. The cadenced tones which the user hears on the telephone lines represent the aforementioned call progress status, i.e. dial tone, busy, ring back ... etc. A user can listen to the present cadenced tone of the telephone line and quickly determine the status of the call being placed. However, when an electronic auto call communication device, such as a modem, for example, makes a call without user intervention, some electronic call progress status detector is needed to make the connect/disconnect decision. A detector of this type monitors the cadenced tone of the telephone line to establish whether or not it is a dial tone and then measures the on and off times or cadence of the dial tone. The measured on and off times are compared with certain prestored on and off time templates of call progress status to determine which status the cadenced tone present on the telephone line represents.

The aforementioned status detection operation appears simple on the surface until one appreciates that there is no universal one-to-one correspondence between a cadenced tone and a call progress status between most telephone networks. Rather, one-to-one correspondence is limited to a telephone network of a country and sometimes only to a given region of a country. In addition, some call progress status tones include multiple cadences which must be analyzed by electronic equipment. Accordingly, the same call progress status may be represented by different cadenced tones from country to country and some countries have the same call progress status represented by different multiple cadenced tones.

Presently, dial modems are designed to analyze the cadenced tones of a telephone network of a country or region thereof and even this analysis is limited to one elemental cadence of the tone. It is, of course, desired to have a modem which is operational in any one of a variety of telephone networks with the capability of detecting each cadenced tone, whether single or multiple, of the same call progress status.

SUMMARY OF THE INVENTION

In accordance with the present invention, apparatus for detecting a cadenced tone progress status of a telephone call comprises: means for detecting a valid tone being generated over a telephone line of any one of a plurality of telephone networks; means for measuring parameters of at least one cadence of the valid tone, the measured parameters being representative of the call progress status present on the telephone line; means for storing a set of parameters for each of the multiplicity of predetermined cadenced tones, some call progress status having multiple different sets of parameters with the same call progress status; and means for comparing the measured parameters with the multiplicity of sets of parameters of the storing means to establish the presence of the call progress status represented by the corresponding cadenced valid tone.

In accordance with another aspect of the present invention, apparatus for detecting a progress status tone of multiple cadences of a telephone call comprises: means for detecting a valid tone of multiple cadences being generated over the telephone line of a telephone network; means for measuring parameters of each cadence of the multiple cadenced tone, the measured parameters being representative of the call progress status present on the telephone line; means for storing a set of parameters for each cadence of the multiple cadenced tone; and means for comparing the measured parameters of each cadence with a corresponding set of cadenced parameters of the storing means to establish the presence of the call progress status represented by the multiple cadenced tone.

DESCRIPTION OF THE PREFERRED EMBODIMENT

Figure 1:
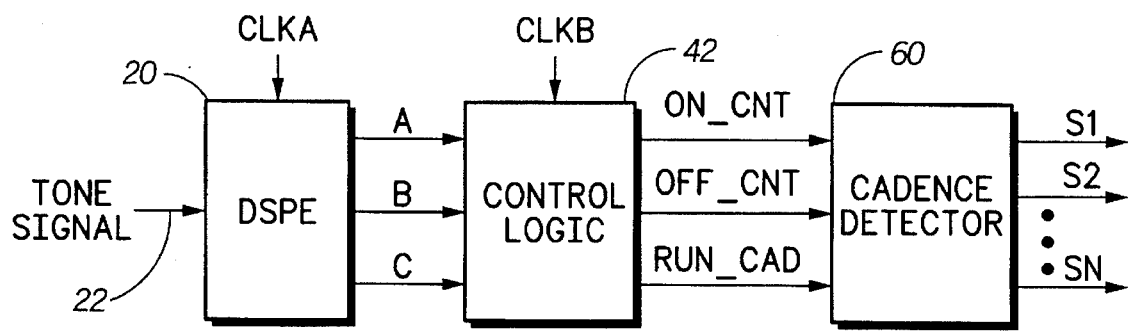
FIG. 1 depicts a functional block diagram schematic of a call progress status detector of a communication device suitable for embodying the principles of the present invention.

FIG. 1 depicts a functional block diagram schematic of a call progress status detector of a communication device suitable for embodying the principles of the present invention. Referring to FIG. 1, a digital signal processing element (DSPE) 20 monitors a telephone line of any one of a plurality of telephone networks to detect a tone signal 22 and determines the validity thereof. The analog tone signal 22 maybe sampled in accordance with a clock signal, designated as CLKA, and each sample thereof digitized and processed therein. A suitable embodiment of the DSPE 20 is shown functionally by the block diagram schematic of FIG. 2.

Figure 2:
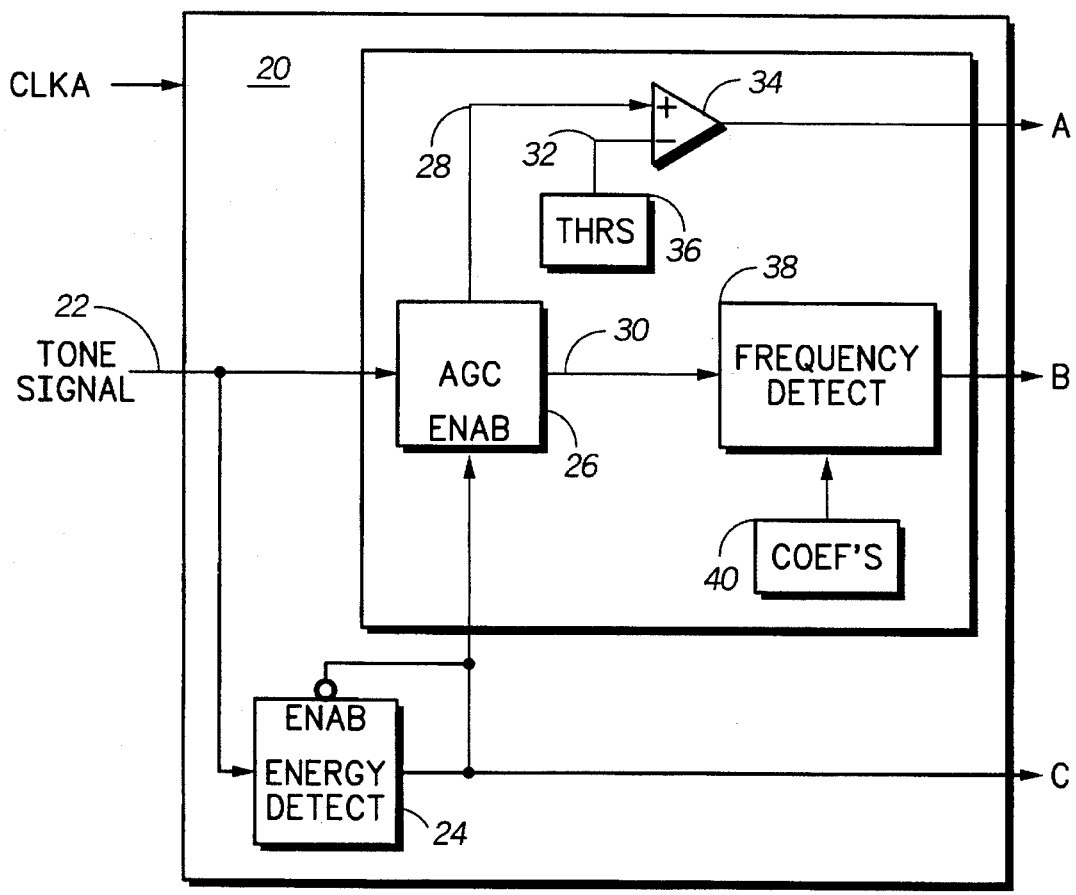
FIG. 2 depicts a functional block diagram schematic of a digital signal processing element suitable for use in the embodiment of FIG. 1.

More specifically, referring to FIG. 2, the sampled tone signal 22 is operated on by a gross energy detection function 24 which performs a "leaky-type" integration on the tone signal 22, and thereafter, compares the resultant signal to an energy detect threshold. When the resultant signal, reaches the threshold, a digital signal or a flag, denoted as C, is set true. When the flag C is set true, it disables the detection function 24 and enables an automatic gain control (AGC) operational block 26. When enabled, the AGC function 26 operates on the tone signal 22 to produce signals 28 and 30 representative of the tone signal 22. Signal 28 is compared with a threshold setting 32 in comparator 34 and a flag, designated as A, is set true when the signal 28 exceeds signal 32. The signal 32 may be a programmable threshold stored in a memory register 36 of the element 20 and represents a valid tone energy threshold level. In addition, the signal 30 is frequency discriminated in an operational block 38 which is basically a band pass filter having a frequency pass band which may be programmed by a set up programmable coefficients which may be stored in memory registers 40 of the processor element 20. The operational block 38 additionally compares the filtered and unfiltered signals 30 to decide for the absence or presence of any tone within the programmed frequency band, and if present, sets a flag B which is a further indication of a valid tone signal. The event of all three flags A, B and C being set true constitutes a detection of a valid tone over the telephone line being monitored.

Referring to FIG. 1, the three output flags A, B and C generated by the signal processor 20 are provided to a control logic block 42 which may be a host processor, such as the 68000 microcomputer system, for example. The control logic 42 monitors the states of the signals A, B and C with every interrupt generated by a clock signal, denoted in the diagram as CLKB. The functional block diagram schematic of FIG. 3 depicts an exemplary functional operation of the logic being performed by the host processor 42.

Figure 3:
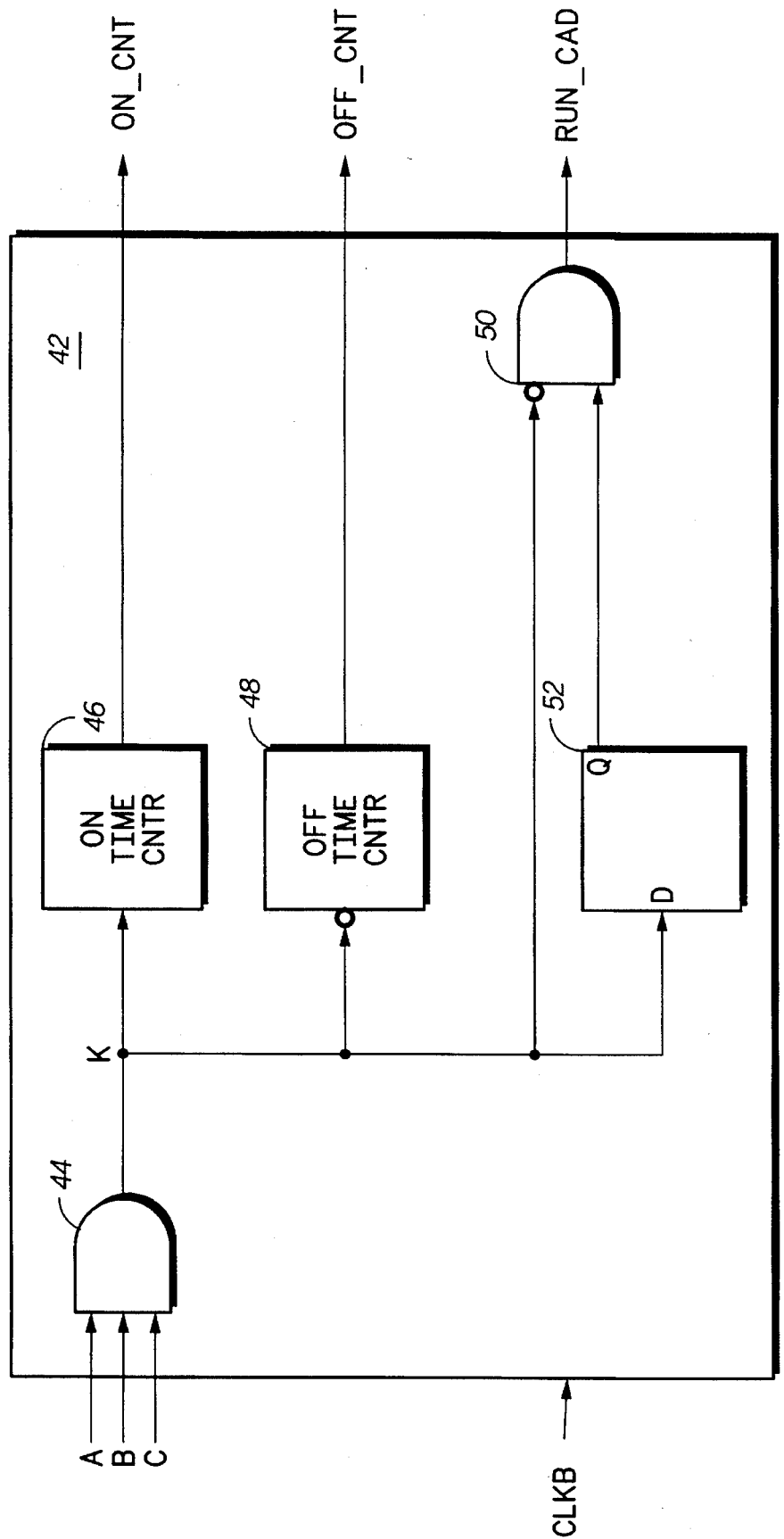
FIG. 3 depicts a functional block diagram schematic of control logic suitable for use in the embodiment of FIG. 1.

Referring to FIG. 3, the signal flags A, B and C are input to a functional AND gate 44 which monitors the states thereof at times synchronous to the signal CLKB. The output signal K of the AND gate 44 is provided to an on time counter 46, off time counter 48, a inverting input of an AND gate 50 and a data (D) input of a flip-flop 52. An output (Q) of the flip-flop 52 is coupled to a non-inverting input of the AND gate function 50. The counters 46 and 48 and the flip flop 52 are operated to count and change states at times synchronous with the clock signal CLKB. In operation, when all the flags A, B and C are true the output signal K of the AND gate 44 is true. In this state, the on time counter 46 is permitted to count up and the Q output of the flip-flop 52 is true. On the otherhand, when either of the flags A, B or C is false, the output signal K is rendered false and in this state, the off time counter 48 is permitted to count up and the Q output of the flip-flop 52 is set false.

Figure 9:
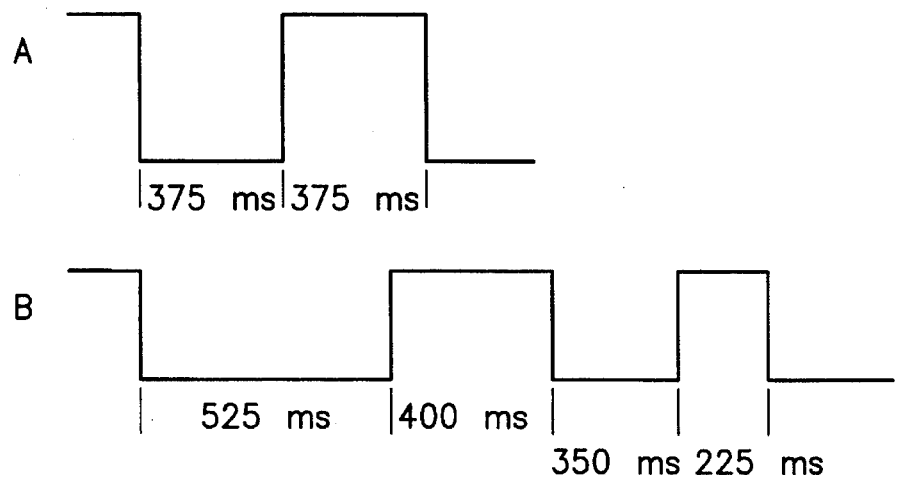
FIG. 9 depicts exemplary cadenced tone waveforms A and B which both represent the same call progress status signal.

In the present embodiment, each period of a cadenced tone signal is defined by an off sub period and an on sub period such as that shown by the exemplary waveforms A and B of FIG. 9. During the off sub period, the signal K is false permitting the off time counter to count up at a predetermined rate. When the transition of off sub period to on sub period occurs, the off time counter stops counting and the on time counter 46 commences counting and continues to count until the transition of on sub period to off sub period occurs. The on to off sub period transition causes a pulse to occur at the output of the AND gate 50 which is designated as RUN CAD. The counts present in the counters 46 and 48 at the on to off sub period transition time represent the measured on time and measured off time parameters of the instant cadence period. And are designated as ON CNT and OFF CNT, respectively. As shown in FIG. 1, these measured parameters of cadence of the tone signal are provided down stream to a call progress status detector 60 each time the signal RUN CAD is pulsed. Thereafter, the counters 46 and 48 are reset to measure the parameters of the next cadence period in accordance with the same sequence of events as described hereabove.

Figure 4:
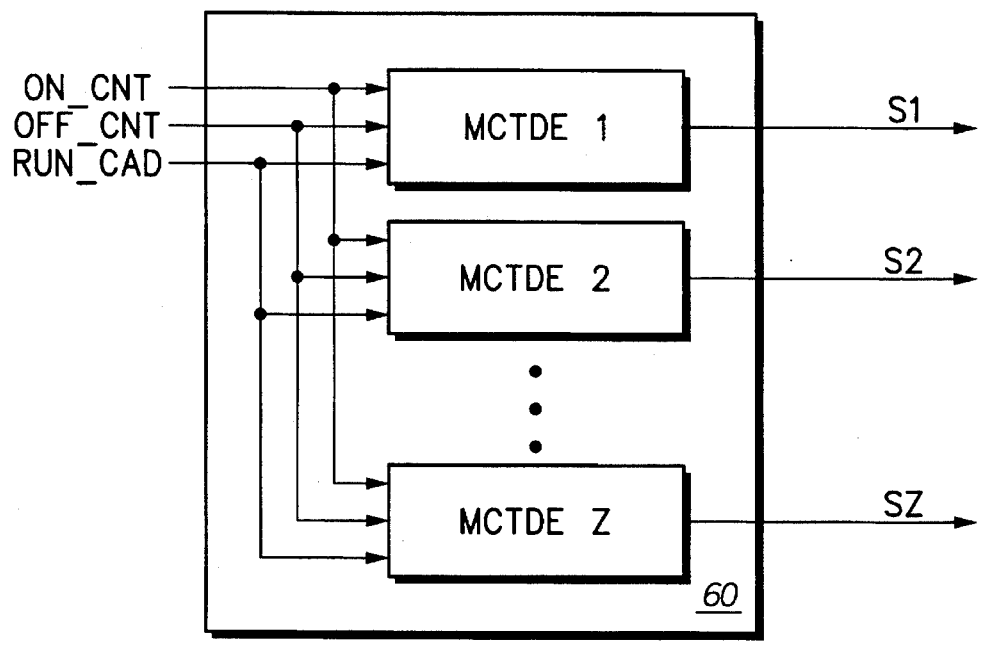
FIG. 4 is a functional block diagram schematic of a cadence detector of a cadence detector suitable for use in the embodiment of FIG. 1.

The block diagram schematic of FIG. 4 depicts a suitable functional arrangement of a cadence detector 60 for use in the call progress status detector embodiment of FIG. 1. Referring to FIG. 4, the measured parameters ON CNT and OFF CNT and the control signal RUN CAD are provided in a functionally parallel arrangement to a plurality of multiple cadenced tone detector elements MCTDE1–MCTDEZ. Each element 1–Z employs a plurality of sets of parameters representing both single and multiple cadence tones of the same call progress status in the various telephone networks of different countries and regions thereof. For example, element 1 may generate a signal S1 based on the detection of a busy signal, element 2 generates signal S2 based on the detection of a dial tone, and so on through element Z which may generate signal SZ indicative of a ring back status. More specifically, in an MCTDE element of the plurality the measured on and off time parameters of each cadence period of a tone signal are compared with all of the sets of parameters of that element to identify whether or not the status corresponding to that element is present on the telephone line. Note that the various operational detection elements 1–Z are structured to substantially simultaneously perform the detection operations thereof. It is understood that a software embodiment will make the aforementioned comparison decisions using sequential processing, but it will do so at such extremely high speeds that the overall function appears to be performed virtually simultaneously. This will become more apparent from the description found here in below.

Figure 5:
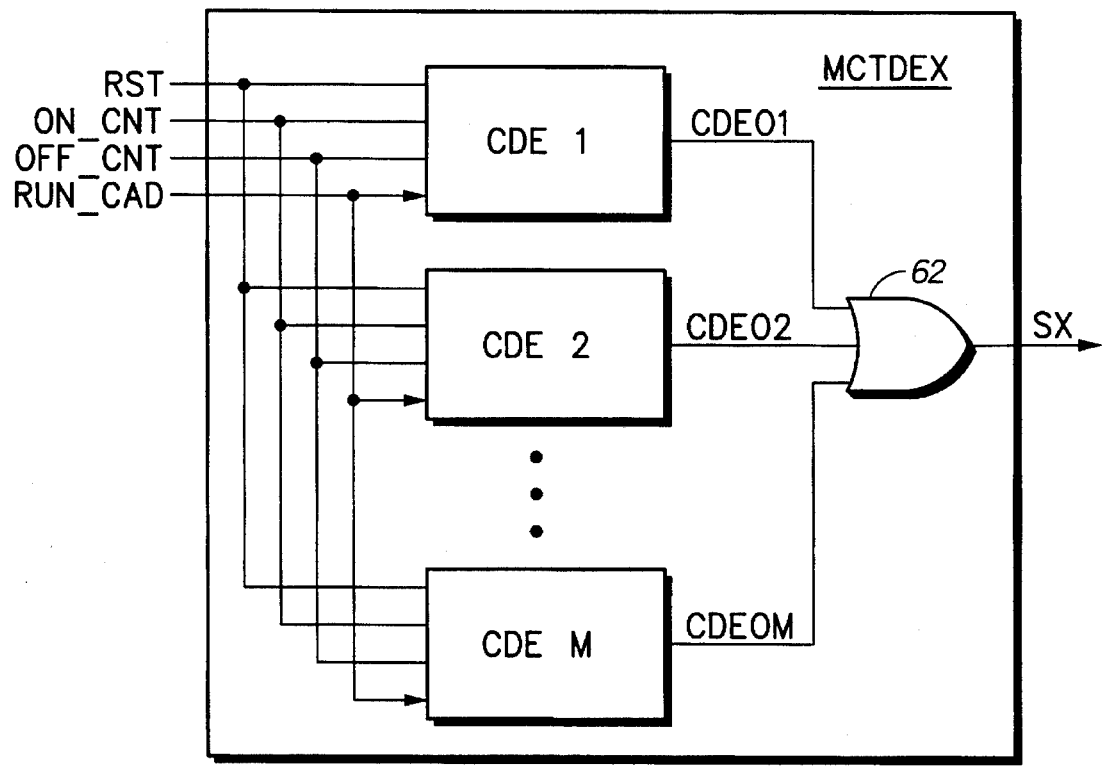
FIG. 5 is a functional block diagram schematic of a multiple cadenced tone detection element suitable for use in the embodiment of FIG. 4.

FIG. 5 depicts a functional block diagram schematic of a suitable embodiment of a multiple cadenced tone detection element. Referring to FIG. 5, the measured cadence parameters and control signals including a reset signal RST are provided in a functional parallel arrangement to a plurality of cadence detect elements CDE1–CDEM. In each cadence detect element, the measured parameters are compared with a separate set of parameters representing one of the cadence tones of the corresponding progress status. If the measured parameters are in agreement with the set of parameters a signal indicating agreement CDEO1–CDEOM is generated by the corresponding cadence detect element CDE1–CDEM, respectively. The indication signals are input to a functional OR gate 62 which generates the corresponding call progress status indication signal SX as explained above.

Figure 6:
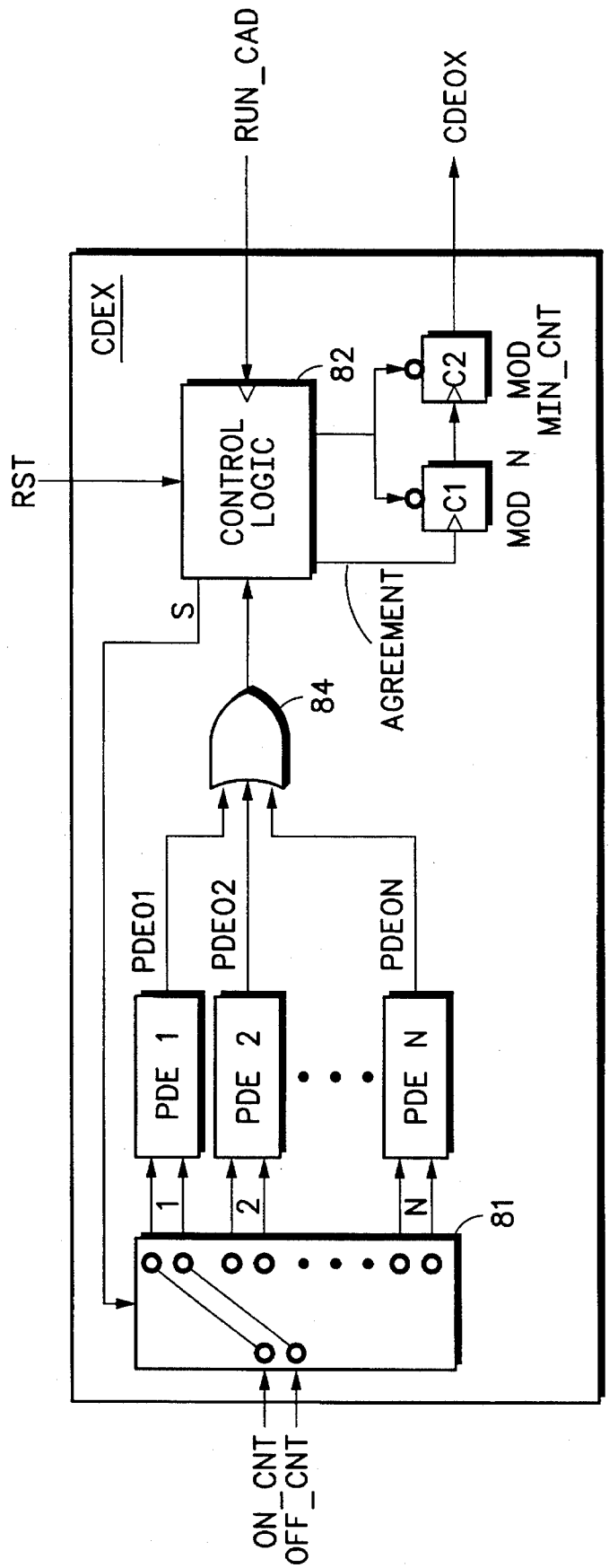
FIG. 6 is a functional block diagram schematic of a cadenced detect element suitable for use in the embodiment of FIG. 5.

The functional block diagram schematic of FIG. 6 suitably embodies the functional operations of an exemplary cadence detect element of the embodiment of FIG. 5. The embodiment of FIG. 6 functionally compares the measured parameters of each cadence of a single or multiple cadence tone sequentially with its corresponding set of parameters of each corresponding cadence period set for the CDE. The embodiment establishes whether or not there is agreement sequentially with each comparison. Included in the embodiment of FIG. 6 are a plurality of period detect elements denoted as PDE1–PDEN, which perform the sequential comparisons corresponding to the preset cadence periods.

Figure 7:
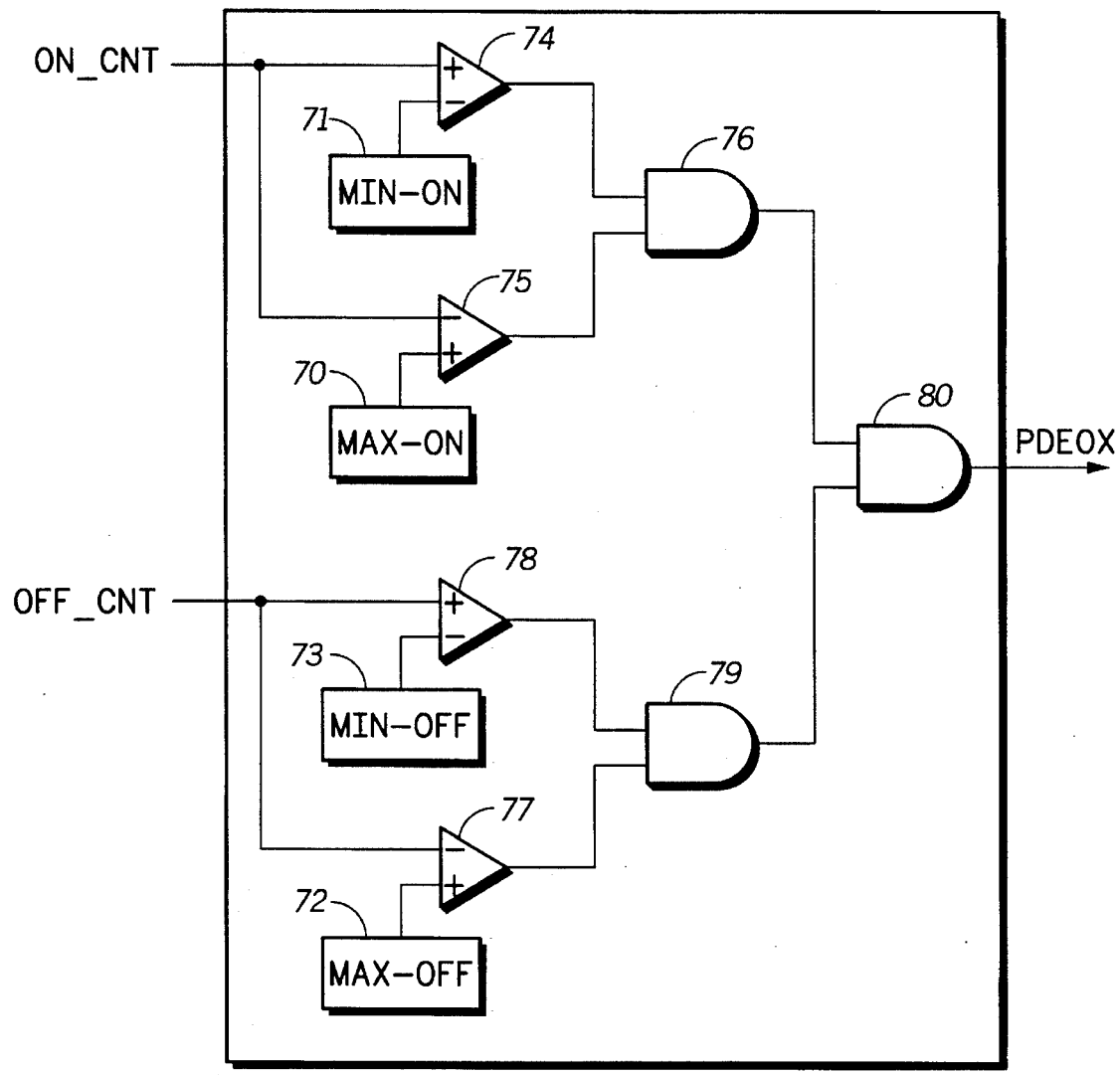
FIG. 7 is a functional schematic diagram of a period detect element suitable for use in the embodiment of FIG. 6.

A suitable embodiment of a PDE is shown in the functional blocked diagram schematic of FIG. 7. In the present embodiment, a set of parameters for a cadence period includes a maximum and minimum ON time and a maximum and minimum OFF time, all of which may be stored in memory registers 70, 71, 72 and 73, respectively, as depicted in the embodiment of FIG. 7. Referring to FIG. 7, the measured ON time parameter (ON CNT) of a cadence period is window compared with its corresponding Max and Min ON time parameter set of registers 70 and 71 utilizing the comparator functions 74 and 75 and AND gate 76. Similarly, the measured Off time parameter (OFF CNT) of the cadence period is window compared with its corresponding Max and Min off time parameter set of registers 72 and 73 utilizing another set of comparators 77 and 78 and an AND gate 79. An AND gate function 80 monitors the outcome of the AND gates 76 and 79 and when there is agreement between the measured and set parameters of both the ON and OFF times, the AND gate 80 generates an indication designated as PDEOX where a X is the integer designation of the corresponding PDE.

Before describing the embodiment of FIG. 6, it is felt that an explanation of an exemplary multiple cadenced tone signal would be in order, an example of a double period cadence tone signal is shown by the waveform B of FIG. 9. Referring to FIG. 9, the OFF and ON times of the first period are substantially measured at 525 milliseconds and 400 milliseconds, respectively, and the OFF and ON times of the second period are measured at 350 milliseconds and 225 milliseconds, respectively. Now going back to FIG. 6, the period detect element (PDE) 1 may include the Max and Min OFF time parameters preset at some plus and minus settings centered about 525 milliseconds and, Max and Min ON time parameters preset at some plus and minus settings centered about 400 milliseconds. Likewise, the PDE2 may include Max and Min OFF time parameters preset about 350 milliseconds and Max and Min ONtime parameters preset about 225 milliseconds. Of course, if there is another cadence period corresponding to the multiple cadence tone then the set parameters thereof would be included in PDE3 and so on.

More specifically, the embodiment of FIG. 6 includes a double pole double throw rotary switch function 81 including switch positions 1, 2 . . . N and pole position P. The measured ON and OFF time parameters are coupled to the pole position inputs and the switch position is controlled by a signal denoted as S generated by a control logic block 82. In the present embodiment, each control signal RUN CAD initiates the control logic 82 to conduct a signal over line S to position switch 81 in a position to permit connection of the corresponding measured ON and OFF cadence parameters to the appropriate PDE operational block say PDE1, for example, wherein a window comparison is performed in accordance with the functional operations described in connection with FIG. 7. If agreement, the signal PDE01 is generated and conducted through an OR gate 84 to the control logic 82 which causes the signal S to govern switch 81 to the next switch position, like position 2, for example. Thereafter, the measured ON and OFF time parameters of the next cadence period in succession are conducted to the PDE2 operational block wherein a similar window comparison is performed in accordance with the set parameters thereof as explained above. Again, if there is agreement, the signal PDEO2 is generated and conducted through OR gate 84 to the control logic block 82.

If the cadenced tone signal of interest includes only a double period cadence as in the example of waveform B of FIG. 9, then the generation of the signals PDE01 and PDE02 in sequence is sufficient to indicate full comparison agreement to the control logic block 82 which, in turn, may generate a signal to an agreement counter designated as C1. In some cases, the CDE operational block may require agreement in more than one successive cadence period of a tone signal before generating the indication CDEOX. For this purpose, a second counter, denoted as C2, is provided to count up the successive agreements generated from counter C1. Accordingly, when the predetermined agreement count is reached in counter C2, the indication signal CDEOX is generated.

It is understood that if there are more than two periods of cadence, then switch 81 is controlled to the next switch setting to conduct the successive measured ON and OFF times to the next PDE unit and the above described procedure is repeated. Should there be disagreement in any of the sequentially conducted window comparisons, the control logic 82 shall reset switch 81 to its starting position and reset counters C1 and C2 to their zero count states. This operation may also be caused to occur during power up utilizing a reset signal RST conducted to the control logic 82.

The call progress status detector described in connection with the functional block diagrams schematic of FIG. 1 may include in the preferred embodiment a cadenced detection algorithm for execution in the host processor of 42 running off data structures in memory. In connection therewith, any cadenced tone may be, in general, characterized by a set of three elements (a) a minimum energy threshold, (b) one or more desired tone frequencies, and (c) a cadenced definition. Accordingly at any given instant one or more signals, defined by (a) (b) and (c) may be present on the telephone line. It is desired to monitor these signals and to indicate their presence via a set of indicators further, it is desirable that the parameters involved be programmable by a user for a modem environment, for example.

More specifically, a minimum energy threshold may be programmed to their required power level for a valid signal on the line utilizing the program memory 36 as described in connection with the embodiment of FIG. 2. In addition, the frequency of the tone signal is in general the energy of the signal in a given energy band. Thus, the presence of a frequency band may be found by one or more pass band filters which may be of N'th order, for example, having coefficients programmable by the user utilizing the memory 40 of FIG. 2. It is understood that the number of filter stages depend on the number of frequency bands that are of interest in the tone signal detection process. Accordingly, the call progress status detector of FIG. 1 first checks that both of the conditions (a) and (b) are met before moving on to condition (c).

With regard to cadence detection, it is understood that a cadenced tone may be of an Nth order with each cadence period thereof having an ON and OFF time which is controlled by Min and Max thresholds. In general, a cadence may be either continuous (order 0) or multiple order (1–N). Accordingly, a continuous cadence is characterized by a single ON time in a specific window of MIN and MAX thresholds. A single cadence has elemental ON and OFF times, each being in a window of Min and Max thresholds. Further, a multiple cadence has multiple elemental cadences with different ON and OFF times specified by sets of Min and Max thresholds. In the present example, all of the elements of these basic blocks are programmable by the user utilizing the memory of the communication apparatus. A first set of detect conditions of a cadence tone is satisfied when the window thresholds pertaining thereto are met. The description here below defines a multiplicity criteria that may be required as a second condition for a valid detect.

In this connection, a particular tone of interest may be valid for more than one characterization of cadence definition for a given energy threshold and frequency specification, i.e. there may exist a multiple of conditions. Accordingly, when either one of these specified conditions is true the presence of a valid tone is indicated. For example, a country may specify a valid ring back tone to be either (a) a double cadence tone with a frequency band [f11, f12], energy threshold T1, "ON" times [ON11, ON12] and "OFF" times [OFF11, OFF12], or (b) a single cadence tone with frequency band [f11, f12], energy threshold T1, "ON" time [ON21] and "OFF" time [OFF21]. In this case, an indication for a valid ring back tone is when either of the conditions (a) or (b) is satisfied. Thus, the MCTDE has then to look for either of conditions (a) or (b) to be true. In general, the MCTDE utilizes the CDE's thereof to make determinations for N possible conditions that may be true corresponding to the same call progress status.

A second condition of multiplicity in the cadence detection process may be entered at least when it is desired to monitor for more than one type of cadence tone simultaneously at any given time. For example, when we are looking for a ring back signal it is customary to simultaneously look for a busy status tone on the telephone line. In the case of modems, another signal which should be monitored is the answer back status tone from a remote modem, for example. In this case, each signal of the three may be specified by a data structure in the memory of the communication apparatus in accordance with that described hereabove. In the interim, there may be Z possible signals of interest in which case each shall be specified in accordance with the above example. Thus, the detector would have Z possible MCTDE indicators reflecting the presence or absence of each of the status signals such as that shown by the element 60 in the embodiment of FIG. 1 and indicated by the signals S1–SZ.

Figure 8A:
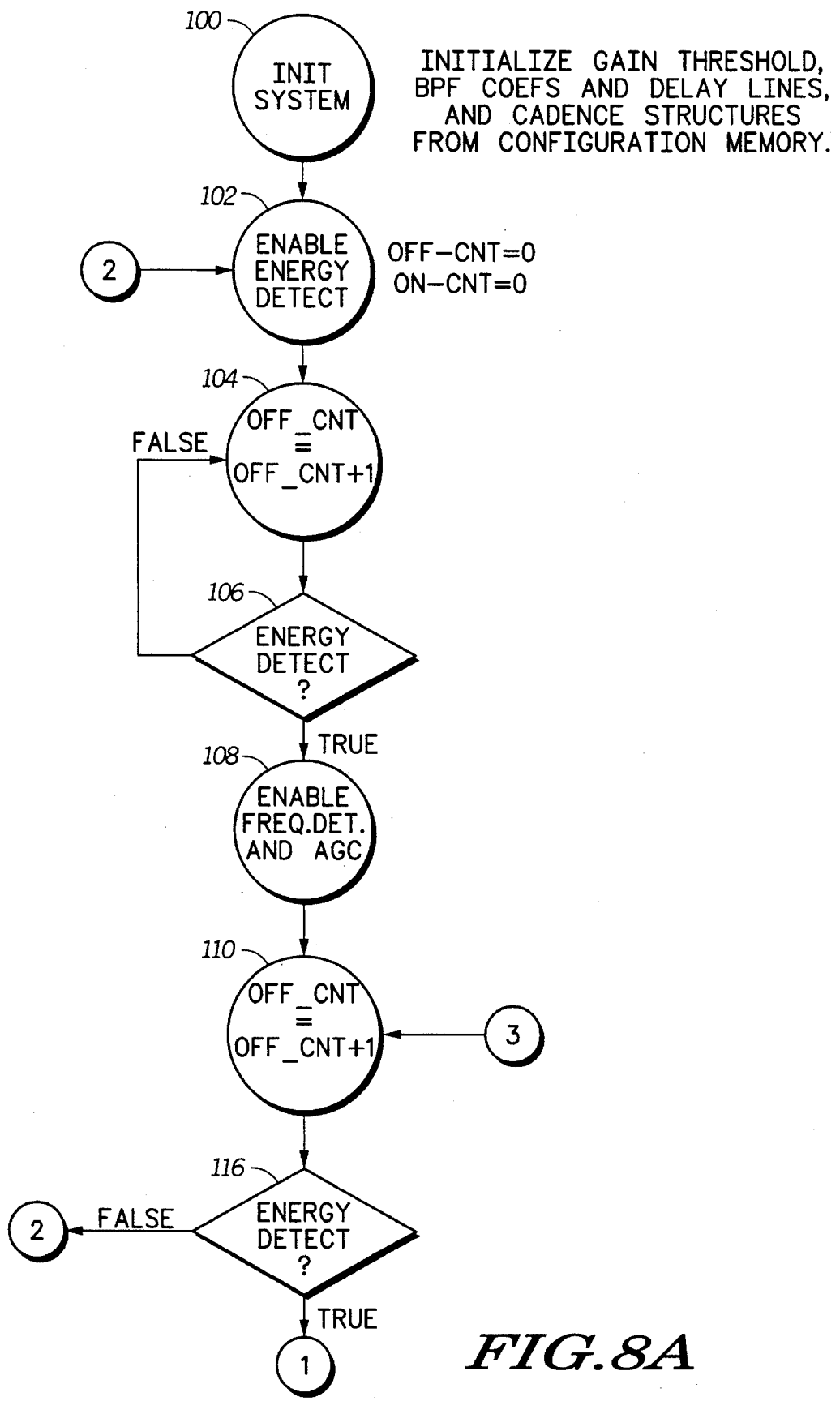
FIGS. 8A and 8B together depict a suitable program flowchart for carrying out the functions of detecting a valid tone signal and measuring the cadenced parameters thereof for use in a host processor embodiment of the present invention.
Figure 8B:
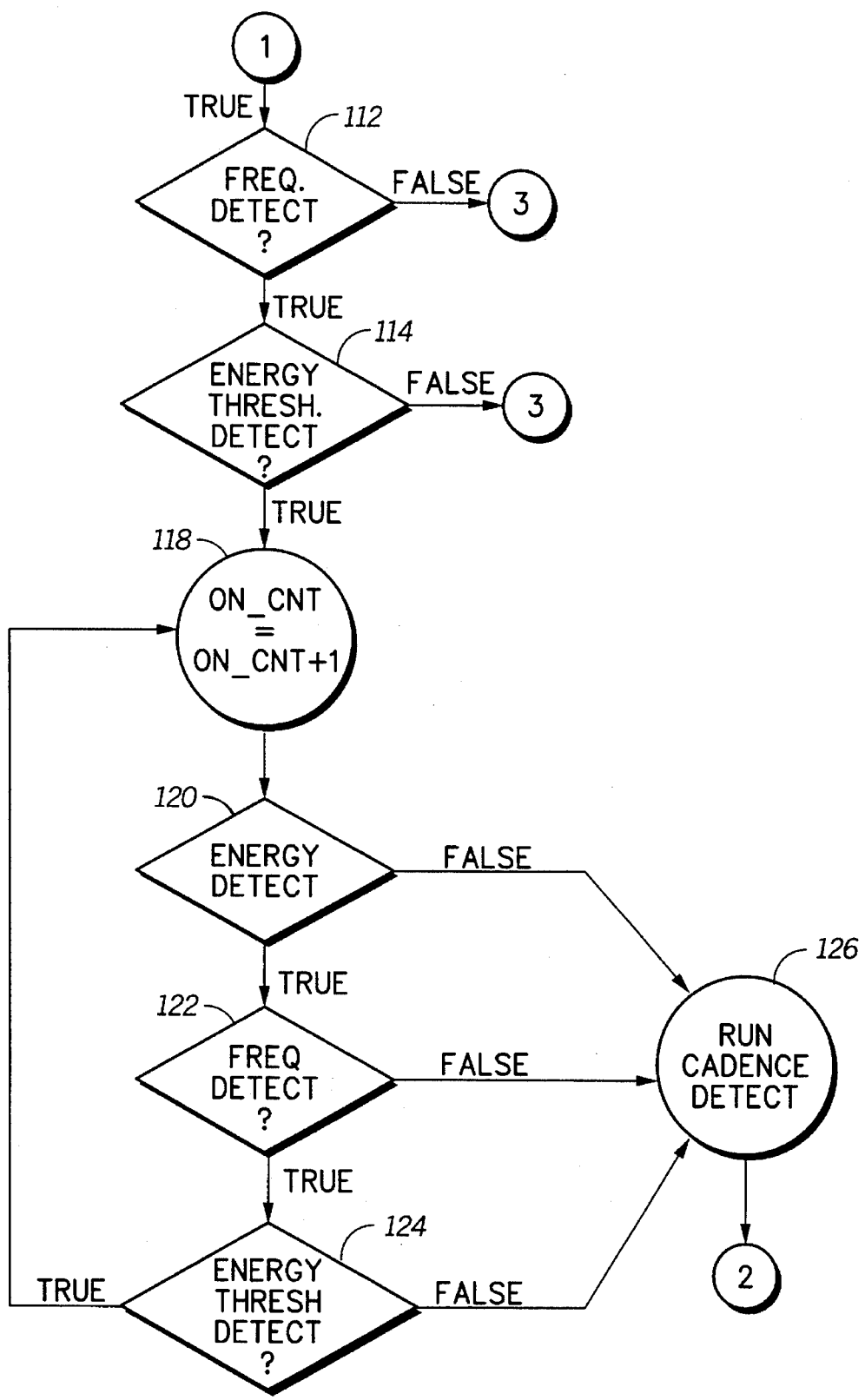

A suitable program flowchart for carrying out the functions of detecting a valid tone signal and measuring the cadence parameters thereof for use in a digital signal processor or microcomputer host environment is shown in FIGS. 8A and 8B. Starting with the Block 100, the program may be initialized by transferring the appropriate data to the gain threshold register, the bandpass filter coefficient registers and the delay line registers and setting up the various parameter sets for the cadence structures from a configuration memory of the processor system. Thereafter, the OFF and ON time counters are set to zero and the program is set to monitor the flag C which is the signal that enables the energy detect unit 24 in Block 102. In Block 104, the OFF time count is incremented by one and the signal flag C is monitored in Block 106. As long as flag C remains in the false state the OFF time measurement counter of the cadence continues to be incremented in Block 104. When flag C is set true, the AGC and frequency detect functions 26 and 38 are enabled by Block 108. The OFF time measurement counter continues to be incremented by the Block 110 as long as the flag B or flag A remains false as determined by the functional blocks 112 and 114, respectively. Also, should the energy detect or flag C signal return to a false state as determined by the decisional Block 116, program execution will be restored at Block 102 wherein the OFF and ON measurement time counters are reset to zero.

Should all of the flags A, B and C remain true as determined by the decisional Blocks 112, 114, and 116, then the ON time measurement counter is incremented in Block 118. Accordingly, the ON time measurement counter of the cadenced period will continue to be incremented by Block 118 as long as the Flags A, B and C remain true. However, should any one of the Flags A, B or C be rendered false as detected by the decisional blocks 120, 122, or 124, then the incrementing of the ON time measurement counter is discontinued and the control signal RUN-CAD is generated by the Block 126 to initiate cadence detection as described functionally hereabove. Program execution is then continued at Block 102 where the validation and measurement processes are repeated for a next cadence period.

Figure 10:
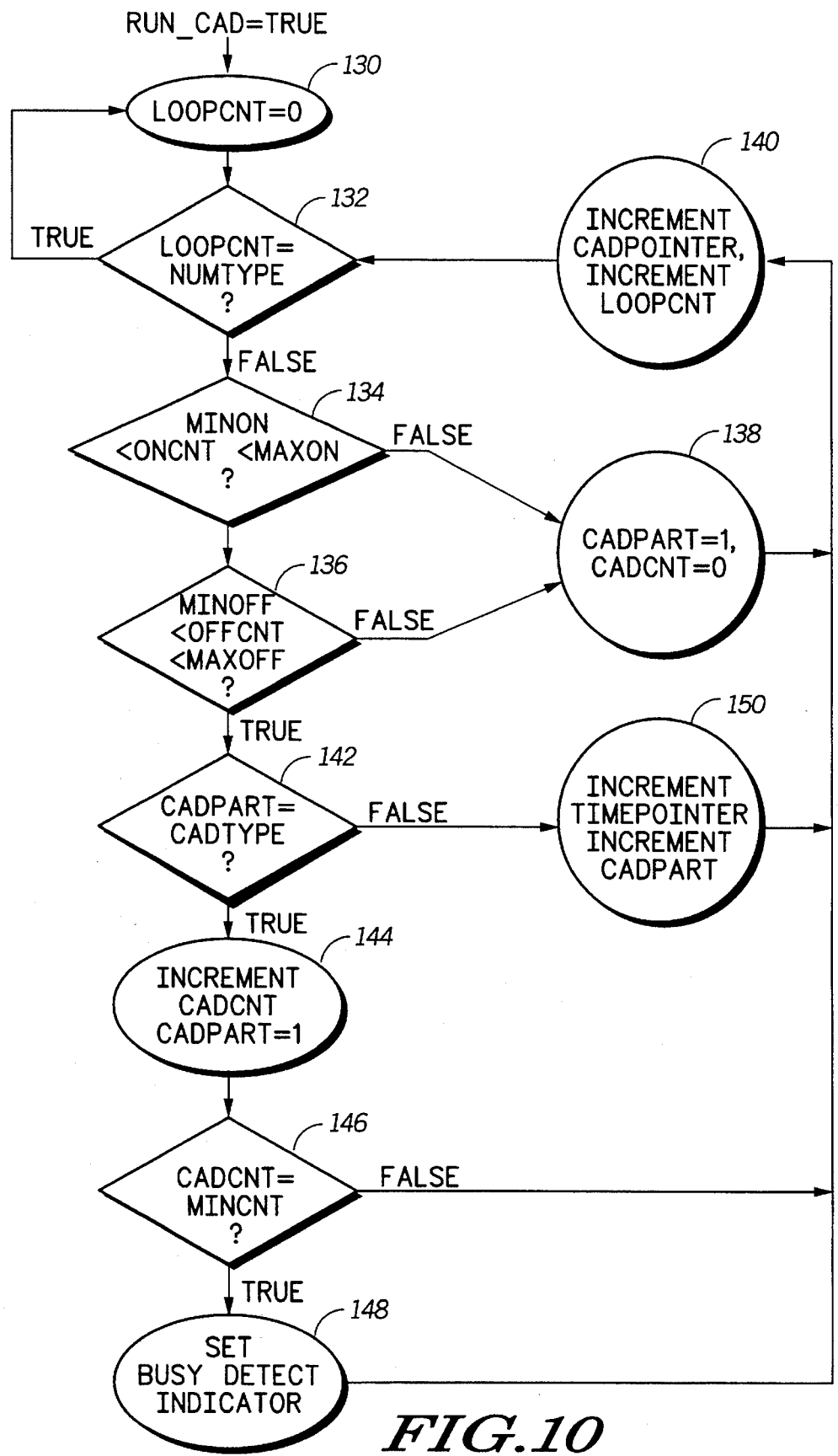
FIG. 10 depicts a program flowchart for performing a cadenced detection function in a host processor embodiment of the present invention.

The programming flowchart of FIG. 10 represents a suitable embodiment of a cadence detector for performing functionally that which is described in connection with the detector 60 hereabove in a host microcomputer, for example. It is understood that this program will not be entered unless the control signal RUN CAD is generated and there exists measured cadence parameters denoted as "ONCNT" and "OFFCNT". To explain the operation of this program example, reference is made to the exemplary waveforms A and B of FIG. 9 which includes a single cadence (A) and double cadence (B) tone both representing a busy signal in a given telephone network.

Figure 11:
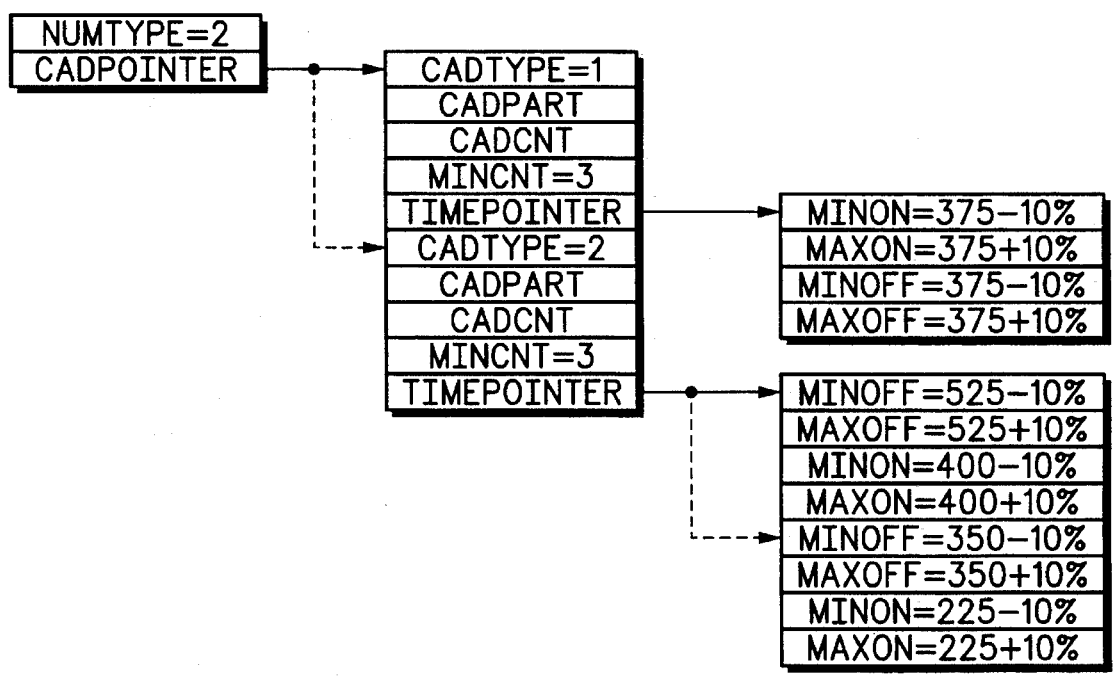
FIG. 11 depicts a memory data structure suitable for use in a host processor embodiment for supporting the detection of the call progress status represented by the waveforms A and B of FIG. 9.

A suitable data structure for storage in a memory of a microcomputer system for supporting the detection of the busy call progress status represented by both of the aforementioned two cadenced tone signals is illustrated in FIG. 11. Referring to FIG. 11, a register denoted as "numtype", is programmed to indicate the number of single and/or multiple cadenced tone signals representing the same call progress status, e.g. busy status. Note that numtype is set to two (2) since there are two valid cadenced which represent the busy status and a register identified by cadpointer stores an address which points to the portion of the data structure storage memory containing the programmed data of the cadenced tone presently being analyzed. In the present example, the cadpointer address would either point to the memory location cadtype=1 or the memory location cadtype=2 which specifies the number of cadences. Further, a cadpart register is set according to the particular cadence of a multiple cadence tone which is being analyzed. Another register cadcnt of the data structure represents the number of agreements in connection with a single or multiple cadenced tone. A mincnt register represents the minimum number of agreements needed in order to generate a status indication. And finally, the time pointer register contains the address of the set of parameters being used in the sequential window comparison process as described above. Note that for a double cadence tone signal, after the first comparison, the address of the time pointer is changed to address a second set of parameters for the window comparison of the second cadence period.

Referring to the programming flowchart of FIG. 10, when the control signal RUN CAD is set true, Block 130 sets a programming parameter loopcnt equal to zero and compares loopcnt to the contents of register numtype in decisional Block 132. Since numtype should be a number greater than zero, the execution should continue at the decisional blocks 134 and 136 to perform the window comparison operation on the measured ON and OFF times corresponding to the current RUN CAD signal. However, if numtype is zero for some reason, program execution is returned to Block 130 and the process is repeated for the next call progress status determination.

The Min and Max ON time parameters and Min and Max OFF time parameters used in the decisional blocks 134 and 136, respectively, are accessed from stored memory in accordance with the timepointer of the corresponding cadtype as described in connection with FIG. 4. It is understood that if cadtype equals one (1), the CALL progress tone is a single cadenced tone, and if cadtype equals two (2), it is a double cadence tone and so on. In the present example of FIG. 11, the first tone (A) to be compared is a single cadence tone for which cadtype is set equal to one (1) and there is only one set of MIN and MAX parameters for the OFF and ON times which are set at 375 milliseconds plus and minus 10%. Referring back to FIG. 10, if either of the decisional blocks 134 or 136 render a false outcome cadpart is set equal to one (1) and cadcnt is set equal to zero (0) in Block 138 and the program execution is returned to Block 140. If both of the decisions of Blocks 134 and 136 are true, cadpart is compared to cadtype in decisional Block 142. In the present example, a single cadence tone is being compared, i.e. cadtype=1, therefore, the decision of block 142 is true permitting execution to continue at the operational Block 144. In Block 144, cadcnt is incremented and cadpart is set equal to one (1). Next in decisional Block 146, cadcnt is compared with the mincnt. In the example of FIG. 11, for the present case, mincnt is equal to three (3). Therefore, agreement in three cadence periods is needed i.e. cadcnt=3, before the decisional Block 146 may continue to Block 148. With each repetition, Block 140 is executed to permit cadpointer to point to the registers in memory storing the set of parameters for the set of measured ON and OFF times of the next cadence period for use in the window comparisons of decisional Blocks 134 and 136. For a single cadenced tone, decisional Block 142 will be true. When cadcnt is incremented up to mincnt as determined by Block 146, it is determined that the measured ON and OFF times of the valid tone represent the single cadenced tone of the busy detect status signal and in response thereto, the busy detect indicator is set in Block 148.

Still using the exemplary flowchart of FIG. 10, for the case where a double cadenced tone is compared, cadtype is set equal to two (2) as shown by the example of FIG. 11. In this case, there are two sets of MIN and MAX parameters for the ON and OFF times representing the two cadenced periods (refer to waveform B of FIG. 9). The first time through the flowchart of FIG. 10, decisional Blocks 134 and 136 performed their window comparison using the MIN and MAX OFF time parameters and MIN and MAX ON time parameters of the first cadence period. If the measured ON and OFF time fall within the window comparisons, the decisional Block 142 determines if additional periods of cadence need to be processed by looking at the content of the corresponding cadtype register. In the instant example of a double cadence period tone, the outcome of Block 142 after the first pass is false and accordingly, Block 150 is executed which increments timepointer to point to the next set of MIN and MAX parameters and increments cadpart to two (2) which represents processing of the second cadence period. Execution is thereafter continued at decisional Block 132 via Block 140 to process the measured ON and OFF times of the second period utilizing the next set of MIN and MAX parameters. The remaining instructional blocks perform the same functions as that described above until it is determined whether or not the measured ON and OFF times of the double cadenced tone represent the busy call progress status in which case the indicator therefore is set in Block 148 constituting detection.

In summary, the present invention in accordance with the above described embodiment is capable of detecting one or more (non-overlapping) elemental cadences of any given tone of a call progress status in a substantial parallel arrangement and set a single indicator like a busy detect indicator, for example, when either of the elemental cadenced tones is detected. Such a detection process is easily extended to several possible tones (e.g. busy tone, ring back tone . . . ) as described above in connection with the functional embodiment with each tone having and possible elemental cadences. Such tones may be simultaneously present on the telephone line. Further described above, the present invention accommodate through a user interface, for example, complete programmability of an energy level for the energy detector, filter coefficients for frequency band select, and the data structure for each elemental cadence such as that shown in FIG. 11, for example.

While the present invention has been described in connection with a preferred embodiment hereabove, it is understood that additions, deletions and modifications may be made there to and equivalent embodiments used without deviating from the basic principles of the present invention. Accordingly, the present invention should not be limited to any single embodiment, but rather construed in scope and breadth in accordance with the recitation of the appended claims.

We claim:

1. An apparatus for detecting progress status of cadenced tones of a telephone call in any one of a plurality of telephone networks by comparing measured parameters of the cadenced tones with a multiplicity of sets of predetermined parameters, said apparatus comprising:

means for detecting valid tones being generated over a telephone line of one of the telephone networks;

means for measuring parameters of at least one cadence of said valid tones, said measured parameters of the cadenced valid tones being representative of the call progress status present on said telephone line;

means for storing a set of parameters for each of a multiplicity of predetermined cadenced tones, some call progress status having multiple different sets of parameters for the same call progress status; and multiple cadence comparing means for comparing the measured parameters with the multiplicity of sets of predetermined parameters of said storing means to establish the presence of the call progress status represented by the corresponding cadenced valid tones, wherein the comparing means includes a comparing element corresponding to each different call progress status of a predetermined plurality of call progress status, each said comparing element for comparing the measured cadence parameters of said valid tone with only the sets of parameters representing the call progress status corresponding to said comparing element to establish if the measured cadence parameters represent the corresponding call progress status, and wherein each comparing element includes at least one cadence detect element for comparing measured parameters of at least one cadence of said valid tone with at least one corresponding set of parameters representing at least one cadenced tone of the associated call progress status, and wherein the cadence detect element includes means for comparing the measured parameters of each cadence of a multiple cadenced tone sequentially with its corresponding set of parameters of each corresponding cadence of the multiple cadenced tone of the associated call progress status to establish whether or not there is agreement sequentially with each comparison, wherein the stored set of parameters for a predetermined single cadenced tone includes a maximum and minimum on time and a maximum and minimum off time of the single cadence thereof: wherein the stored set of parameters for a predetermined multiple cadenced tone includes a maximum and minimum on time and a maximum and minimum off time for each cadence of the multiple cadences thereof; and wherein the measured parameters of each cadence of the valid tone include a measured on time and a measured off time, wherein for each cadence comparison, the corresponding measured on time is window compared with its corresponding maximum and minimum on time and the corresponding measured off time is window compared with its corresponding maximum and minimum off times; and wherein agreement is established when both the measured on time and measured off time falls within their respective comparison windows, wherein the cadence detect element further includes means for detecting disagreement in a cadence comparison and for resetting the comparison sequence to an initial state in response to said detected disagreement, and wherein the cadence detect element further includes means for counting each period of multiple cadences for which there is no comparison disagreement and for generating a signal representing the presence of the corresponding call progress status when said counting means reaches a predetermined count.

2. An apparatus for detecting progress status tones of multiple cadences of a telephone call in a telephone network, said apparatus comprising:

means for detecting each valid tone of multiple cadences being generated over a telephone line of the telephone network;

means for measuring parameters of each cadence of said multiple cadenced tones, said measured parameters of the multiple cadenced tone being representative of the call progress status present on said telephone line;

means for storing a set of parameters for each cadence of said multiple cadenced tones; and multiple cadence comparing means for comparing the measured parameters of each cadence with a corresponding set of cadence parameters of said storing means to establish the presence of the call progress status represented by said multiple cadenced tones, wherein the comparing means includes a comparing element corresponding to each different call progress status of a predetermined plurality of call progress status, each said comparing element for comparing the measured cadence parameters of said valid tone with only the sets of parameters representing the call progress status corresponding to said comparing element to establish if the measured cadence parameters represent the corresponding call progress status, and wherein each comparing element includes at least one cadence detect element for comparing the measured parameters of the multiple cadences of said valid tone with corresponding multiple sets of parameters representing the multiple cadences of the cadenced tone of the associated call progress status, wherein the cadence detect element includes means for comparing the measured parameters of each cadence of the multiple cadenced tone sequentially with its corresponding set of parameters of each corresponding cadence of the multiple cadenced tone of the associated call progress status to establish whether or not there is agreement sequentially with each comparison, wherein the stored set of parameters for a predetermined multiple cadenced tone includes a maximum and minimum on time and maximum and minimum off time for each cadence of the multiple cadences thereof; and; wherein the measured parameters of each cadence of the valid tone include a measured on time and a measured off time, wherein for each cadence comparison, the corresponding measured on time is window compared with its corresponding maximum and minimum on times and the corresponding measured off time is window compared with its corresponding maximum and minimum off times; and wherein agreement is established when both the measured on time and measured off time falls within their respective comparison windows, wherein the cadence detect element further includes means for detecting disagreement in a cadence comparison and for resetting the comparison sequence to an initial state in response to said detected disagreement, and wherein the cadence detect element further includes means for counting each period of multiple cadences for which there is no comparison disagreement and for generating a signal representing the presence of the corresponding call progress status when said counting means reaches a predetermined count.

* * * * *